(12) United States Patent
Alcoverro et al.

(10) Patent No.: US 7,249,487 B2
(45) Date of Patent: Jul. 31, 2007

(54) DEVICE FOR CALIBRATING A PRESSURE DETECTOR

(75) Inventors: Benoît Alcoverro, Arpajov (FR); Jérôme Laurent, Ollainville (FR)

(73) Assignee: Commissariat a l'Energie Atomique, Paris (FR)

( * ) Notice: Subject to any disclaimer, the term of this patent is extended or adjusted under 35 U.S.C. 154(b) by 422 days.

(21) Appl. No.: 10/467,970

(22) PCT Filed: Feb. 13, 2002

(86) PCT No.: PCT/FR02/00544

§ 371 (c)(1),
(2), (4) Date: Aug. 12, 2003

(87) PCT Pub. No.: WO02/065082

PCT Pub. Date: Aug. 22, 2002

(65) Prior Publication Data
US 2005/0257598 A1 Nov. 24, 2005

(30) Foreign Application Priority Data
Feb. 15, 2001 (FR) .................................. 01 02063

(51) Int. Cl.
G01L 27/00 (2006.01)

(52) U.S. Cl. ...................................... 73/1.57

(58) Field of Classification Search ................. 73/1.57, 73/1.64, 1.66, 1.82
See application file for complete search history.

(56) References Cited

U.S. PATENT DOCUMENTS

| | | | | |
|---|---|---|---|---|
| 3,281,543 A | | 10/1966 | Clay et al. ................ 179/175.1 |
| 3,744,294 A | * | 7/1973 | Lewis et al. ................. 73/1.82 |
| 4,189,936 A | * | 2/1980 | Ellis ........................... 73/1.66 |
| 4,698,997 A | * | 10/1987 | Hess et al. .................... 73/1.64 |
| 4,748,598 A | * | 5/1988 | Kopke .......................... 367/13 |
| 4,909,064 A | * | 3/1990 | Talmadge ................... 73/1.82 |
| 5,567,863 A | | 10/1996 | Larson et al. .................... 73/1 |

FOREIGN PATENT DOCUMENTS

WO WO 9322891 A1 * 11/1993

* cited by examiner

Primary Examiner—Hezron Williams
Assistant Examiner—Tamiko Bellamy
(74) Attorney, Agent, or Firm—Thelen Reid Brown Raysman & Steiner LLP

(57) ABSTRACT

Device for calibrating a pressure detector, particularly an infrasonic pressure detector. This device includes measurement means for applying to this detector a reference pressure which varies depending on time and all of whose spectrum components covering a predetermined frequency range are excited simultaneously with one and the same amplitude and a zero phase shift, or a constant delay, relative to each other.

21 Claims, 1 Drawing Sheet

DEVICE FOR CALIBRATING A PRESSURE DETECTOR

CROSS-REFERENCE TO RELATED APPLICATION

This application claims priority based on International Patent Application No. PCT/FR02/00544, entitled "Device For Calibrating A Pressure Detector, Praticularly an Infrasonic Pressure Detector" by Benoit Alcoverro and Jerome Laurent, which claims priority of French application no. 01 02063, filed on Feb. 15, 2001, and which was not published in English.

TECHNICAL FIELD

The present invention relates to a device for calibrating a pressure detector.

The invention applies particularly to the calibration of an infrasonic pressure detector, in other words to the calibration of a pressure detector which is intended for the measurement of infrasonic waves.

The invention applies more particularly to the calibration of a pressure detector intended for the measurement of infrasonic waves with frequencies in the interval from 0.001 Hz to 100 Hz.

PRIOR ART

Pressure detector calibration is necessary to ensure the validity of the measurements taken with such a detector.

It is known that an absolute pressure detector is calibrated by applying a known static pressure to this detector, using a pump, and that the value of this pressure is measured by means of a precision pressure gauge which is connected to the detector. Such a pressure gauge is commercially available for example from the Keller Company.

Such technology allows only the sensitivity of the pressure detector to be known with acceptable precision; it does not allow the amplitude and phase response of the detector to be verified.

Moreover, this technology cannot be used for a differential pressure detector, a detector that does not measure static pressures.

In that case, generally speaking, means are used to generate a sinusoidal pressure with the frequency located in the estimated detector bandwidth. The detector is made to communicate with a closed enclosure and the air contained in this enclosure is compressed using a piston, which is driven with an alternating movement by electromechanical means.

The amplitude of the pressure so generated is not as precise as the amplitude of the static pressure generated for the purpose of calibrating an absolute pressure detector since the sensitivity to variations in atmospheric pressure and to variations in temperature is no longer negligible for frequencies below 1 Hz.

Moreover, it is very difficult to know exactly the ratio of the volume displaced by the piston to the volume of the unit formed by the calibrating device and the quiescent detector.

It is therefore difficult to know accurately the pressure applied.

Additionally, the masses of the moving mechanical components are likely to restrict the bandwidth of this type of calibration device in the high frequency domain.

The technologies that have just been described do not make it possible to characterise completely, with the required precision, an infrasonic pressure detector.

DISCLOSURE OF THE INVENTION

One purpose of the present invention is to overcome the previous drawbacks and to propose a calibration device that is valid both for an absolute pressure detector and for a differential pressure detector.

The invention seeks in particular to verify the dynamic response of an (absolute or differential) pressure detector, this detector being intended for the measurement of infrasonic waves by measuring the transfer function of this detector in a frequency range from 0.001 Hz to 100 Hz.

To be precise, the subject of the present invention is a device for calibrating a pressure detector, this device being characterised in that it includes measurement means provided to apply to this detector a reference pressure which varies depending on time and all of whose spectrum components covering a predetermined frequency range are excited simultaneously with one and the same amplitude and a zero phase shift, or a constant delay, relative to each other.

The device that is the subject of the invention may be provided for the calibration of an absolute pressure detector or for the calibration of a differential pressure detector.

This detector is for example intended for the measurement of infrasonic waves. In this case, the predetermined frequency range is preferably from 0.001 Hz to 100 Hz.

According to a preferred embodiment of the device that is the subject of the invention, the measurement means include:

- a first enclosure intended to be connected to the pressure detector,
- a membrane having first and second surfaces, the first enclosure being sealed by means of the first surface,
- an electro-dynamic motor intended to displace the membrane so as to generate the reference pressure in the first enclosure, and
- control means intended to apply to the electro-dynamic motor an electrical signal of the pseudo-random type, the amplitude of which is known and which is triggered synchronously.

Preferably the membrane is rigid or rigidified.

Additionally, this membrane is preferably made impermeable.

It is also preferable for the device to include a second enclosure sealed by means of the second surface of the membrane.

According to a preferred embodiment of the invention, the control means include:

- a reference voltage source, this source being adjustable,
- means for the amplification and inversion-amplification of the voltage supplied by this source, and
- means of switching the voltage so amplified and the voltage so inverted and amplified, these switching means being intended to apply the pseudo-random electrical signal to the electro-dynamic motor.

Preferably, these control means additionally include:

- a microphone provided to detect variations in pressure in the first enclosure,
- means for the rectification, filtering and analogue-to-digital conversion of the electrical signals supplied by the microphone, and a micro-controller provided to control the reference voltage source and the switching means as a function of the signals so filtered, rectified and converted to digital form.

BRIEF DESCRIPTION OF THE DRAWINGS

The present invention will be better understood from reading the description of embodiment examples given hereinafter, purely by way of example and in no way restrictively, with reference to FIG. 1 which is a diagrammatic view of one particular embodiment of the device that is the subject of the invention.

DETAILED DISCLOSURE OF PARTICULAR EMBODIMENTS

Figure 1:
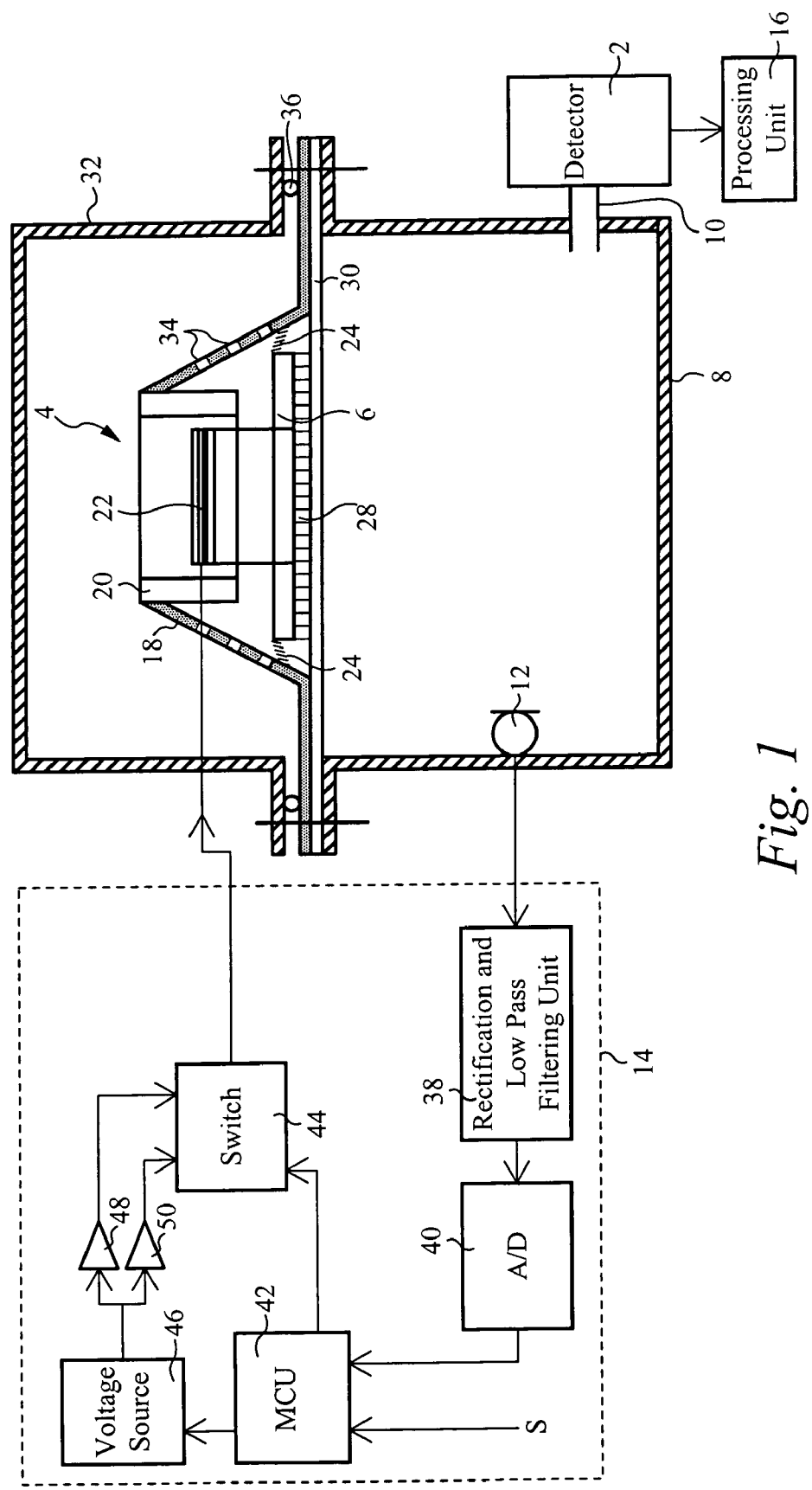

The device according to the invention, which is shown diagrammatically in FIG. 1, is intended to calibrate an (absolute or differential) pressure detector 2. This detector is intended for the measurement of infrasonic waves in the frequency band from 0.001 Hz to 100 Hz.

It should be noted that the detector 2 may have a narrower bandwidth than the frequency band, or measurement band, mentioned above but, in the example under consideration, this detector is measured on this frequency band.

The device according to the invention, which is shown in FIG. 1, includes measurement means comprising an electro-dynamic motor 4 and a light and rigid membrane 6 which is intended to be set in motion by this electro-dynamic motor, the latter being located facing the rear surface of the membrane 6.

The device also includes an enclosure 8, or front enclosure, which is sealed by means of the front surface of the membrane 6.

The pressure detector 2, which it is required to calibrate, communicates by means of a pipe 10 with this front enclosure 8.

The device additionally includes a calibrated microphone 12 which is anchored into this front enclosure, against one of its walls, and control means 14, provided to control the electro-dynamic motor 4 as a function of electrical signals supplied by the microphone 12.

Also in the figure can be seen means 16 for processing the signals supplied by the pressure detector 2.

To measure the transfer function of this detector in the frequency band mentioned above, a reference pressure is applied to the detector 2 all of whose spectrum components, which cover this frequency band, are excited simultaneously, with one and the same amplitude and a zero phase, or a constant delay, relative to each other.

It should be noted that in displacing the light rigid membrane 6, the electro-dynamic motor compresses the closed volume delimited by the front enclosure 8 and by the acoustic circuits of the pressure detector 2, these acoustic circuits forming the input acoustic impedance of the detector 2.

The type of excitation applied to the electro-dynamic motor 4 is a pseudo-random electrical signal, of known amplitude and which is triggered synchronously (in other words the moment is known at which the pseudo-random sequence, mentioned below, is started relative to the measurement carried out by the means 16 so as to commit no error in measuring the phase of the detector 2).

This electro-dynamic motor 4 is a commercially available loudspeaker including an armature 18, a magnet 20, a moving coil 22 and the membrane 6, which is made integral with this moving coil.

This loudspeaker also includes a means 24 for the peripheral suspension of the membrane 6, allowing it to be suspended from the peripheral part of the loudspeaker armature 18. This peripheral part of the armature 18 is anchored to one edge of the front enclosure 8, as can be seen in the figure, in such a way that the front surface of the membrane 6 seals this front enclosure, this front surface being located facing the cavity delimited by the front enclosure 8.

To restrict non-linearities when the pressure is strong, the membrane 6 is rigidified by a honeycomb component 28, for example disk-shaped, which is bonded to the front surface of the membrane 6

Moreover, in order to be able to generate very low frequencies, the membrane 6 is made impermeable. To do this, a rubber membrane 30, disk-shaped for example, is used, which is bonded onto the honeycomb disk 28.

This rubber disk 30 covers the peripheral part of the armature 18 in the example shown. This disk 30 is therefore included between the loudspeaker 4 and the corresponding edge of the front enclosure 8 and ensures tightness in anchoring the loudspeaker 4 onto this corresponding edge of the front enclosure 8.

In an example not shown of the invention, the rubber disk 30 is not used and this tightness is provided by an O-ring.

The honeycomb disk 28 is made of a composite material. In place of this honeycomb disk, a box-type structure made of titanium may for example be used.

It is preferable for the front cavity 8 to have sufficient volume, which can be determined by analysing the acoustic load supplied by the pressure detector, so as to ensure the insensitivity of the reference pressure in respect of this acoustic load.

Moreover, to reduce the sensitivity of measurements to variations in atmospheric pressure, it is preferable to use another enclosure 32 forming a rear enclosure, which is closed by means of the rear surface of the membrane 6.

If the loudspeaker were provided with a cover, this cover would constitute the rear enclosure. However, as is generally the case for commercial loudspeakers, the armature 18 comprises apertures 34 and the rear enclosure 32 is then added to the device. The membrane is thus included between the latter and the enclosure 8.

As can be seen, the peripheral part of the loudspeaker armature 18 is anchored to one edge of the rear enclosure 32 and the tightness of the connection between the peripheral part of the armature 18 and the rear enclosure 32 is ensured by an O-ring 36.

The volume delimited by the rear enclosure 32 (into which the electro-dynamic motor has been placed) thus provides the control of the linearity of the amplitude and phase response at high frequencies.

The acoustic compliance of the rear enclosure 32 makes it possible to reduce the apparent acoustic compliance of the membrane 6 and thus increases its resonant frequency at constant mobile mass.

A pipe 10 of the smallest possible length is used to connect the pressure detector 2 to the calibration device and to repel beyond the frequency band any disturbances induced by the coupling between the detector 2 and the calibration device.

The resonant acoustic circuit formed by the pipe 10 and by the inside of the pressure detector 2 causes these disturbances.

It should be noted that the weaker the acoustic compliance of the rear enclosure 32, the more the apparent acoustic compliance of the membrane 6 is reduced and the more the resonant frequency is increased.

The control means 14, which are part of the device diagrammatically shown in the figure, include:

means 38 for the rectification and low-pass filtering of the electrical signals supplied by the microphone 12, an analogue-to-digital converter 40 which converts the analogue signals supplied by these filtering and rectification means 38 into digital signals, a micro-controller 42 which receives the input digital signals supplied by this analogue-to-digital converter 40 and a signal S, which is for example emitted by a GPS clock, this signal S being a signal for starting a pseudo-random sequence about which more will be said later, this sequence being also measured by the detector 2 and received by the means 16, and a power switch 44 which receives input control signals supplied by the micro-controller 42, an adjustable reference voltage source 46 which is controlled by the micro-controller 42 and which supplies a reference voltage in analogue form, a digital-to-analogue converter being built into the source 46, a power amplifier 48 which amplifies this reference voltage, and a power inverter-amplifier 50 which inverts the reference voltage and amplifies the voltage so inverted.

The amplified reference voltage and the inverted and amplified reference voltage supply the coil 22 of the loudspeaker 4 by means of the power switch 44 controlled by the micro-controller 42.

The value of the reference pressure depends on the reference voltage modulated by the pseudo-random signal generated by the micro-controller 42. This reference pressure may therefore be adjusted to the required value by modifying the reference voltage and therefore by modifying the pseudo-random signal supplied by the micro-controller 42.

Before each calibration, a signal is applied to the loudspeaker 4 of known amplitude and frequency by means of the power switch 44.

The calibrated microphone 12 measures this signal in the upper part of the useful frequency band, this upper part being, for example, from about 3 Hz to about 50 Hz.

After rectification and low-pass filtering, the measurement voltage supplied by the microphone 12 is the image of the pressure generated, with an almost constant coefficient.

The micro-controller then adjusts, as a function of the rectified, filtered and digitised voltage, the reference voltage used to generate the electrical signal sent to the coil 22 and thus to obtain the required pressure, thereby taking into account the measurement made by the microphone 12.

To obtain the required precision, several sequences of measurement of the reference pressure may be sent consecutively before the pseudo-random measurement sequence is sent, by the micro-controller 42, to the reference voltage source 46.

The following precisions are introduced to the device according to the invention, shown in the figure:

the simultaneous excitation of all the spectrum components covering the [0.001 Hz; 100 Hz] interval results from the pseudo-random signal, the same amplitude of excitation for all these components results from the tightness of the front enclosure 8 and from the low value of the volume of the rear enclosure 32, the zero phase shift of these components relative to each other during their excitation results from the low value of the apparent compliance, of the suspension means 24 associated with the rear enclosure 32, the pseudo-random character of the electrical signal applied to the electro-dynamic motor results from the use of pseudo-random sequences to control the switch 44, and the amplitude of this signal is known because it is fixed by the reference voltage 46.

Precisions are also introduced to the function of the power switch:

The latter receives simultaneously a voltage +V from the amplifier 48 and the voltage −V from the inverter-amplifier 50. As it receives a digital value from the micro-controller, this allows it to provide an analogue voltage proportionate to this digital value.

Purely by way of indication and in no way restrictively, an example is now given of calibration of an infrasonic detector. This is an MB2000 absolute pressure detector designed at the French Atomic Energy Commission (CEA) and marketed by the Tekelek company.

To measure the dynamic response of this infrasonic detector, a loudspeaker is used of 30 cm diameter and with a linear elongation of ±5 mm. The enclosures are made with welded stainless steel sheets, tightness between the enclosures and the loudspeaker being provided by the rubber membrane 30 and the O-ring 36, as has been seen. The volume of the front enclosure is 30 dm$^3$ and the volume of the rear enclosure is 2 dm$^2$.

The MB2000 infrasonic detector comprises four air inlet vents 45 mm in length. During calibration, three of these vents are blocked and the fourth, which then constitutes the pipe 10 (45 mm in length in this example), is inserted in a sealed way into the front enclosure of the calibration device.

The reference voltages reaching the power switch do not exceed, respectively, +50 V and −50 V. This allows pressures to be generated which may reach 10 hPa with a linear frequency response from 0.001 Hz up to 80 Hz and a phase which does not vary by more than 3°.

The reference pressure test sequence is carried out with a square wave with a frequency equal to 10 Hz.

The reference pressure during the test phase is measured with the microphone marketed by the B&K company with the reference number 4189, whose signal is low-pass filtered at 50 Hz. Precision in measuring the pressure generated is of the order of a few percent.

The invention is not restricted to calibration in the [0.001 Hz; 100 Hz] frequency band. It also applies to other frequency bands, for example from 0.001 Hz to 500 Hz.

Moreover, the invention is not restricted to the calibration of an infrasonic pressure detector. It also applies to the calibration of hydrophones.

Additionally, the invention is not restricted to the calibration of an absolute pressure detector. It applies to the calibration of any pressure detector, particularly to the calibration of a differential pressure detector, for example a microphone.

The invention claimed is:

1. A calibration device comprising:

an enclosure adapted to receive a pressure sensor; and means for generating a reference pressure within the enclosure from an electrical signal, wherein the electrical signal includes simultaneously excited frequency spectrum components having a substantially same amplitude, the means for generating further comprising:

a membrane positioned within the enclosure and configured to partition the enclosure into a first enclosure and a second enclosure; and an electro-dynamic motor coupled to the membrane, wherein the electro-dynamic motor is configured to displace the membrane to generate the reference pressure in the first enclosure in response to the electrical signal.

2. The calibration device of claim 1, wherein the excited frequency spectrum components have a zero phase shift.

3. The calibration device of claim 1, wherein the excited frequency spectrum components have a constant delay.

4. The calibration device of claim 1, wherein the pressure sensor is an absolute pressure sensor.

5. The calibration device of claim 1, wherein the pressure sensor is a differential pressure sensor.

6. The calibration device of claim 1, wherein the reference pressure generated is time varying.

7. The calibration device of claim 1, wherein the frequency spectrum components are in a frequency range of and including 0.001 Hz to 100 Hz.

8. The calibration device of claim 1, wherein the second closure is sealed by the second surface of the membrane.

9. The calibration device of claim 1, wherein the means for generating further comprises:
a voltage source configured to provide a reference voltage;
means for providing an amplified voltage from the reference voltage;
means for providing an inverted amplified voltage from the reference voltage; and
means for selectively switching between the amplified voltage and the inverted amplified voltage to produce the electrical signal to an electro-dynamic motor within the enclosure.

10. The calibration device of claim 1, wherein the means for generating further comprises:
a microphone configured to detect variations in pressure in the enclosure and output a signal;
means for filtering the signal supplied by the microphone; and
means for controlling the reference voltage source and the switching means as a function of the filtered signal and a pseudo random signal.

11. A calibration device comprising:
an enclosure adapted to receive a pressure sensor for calibration;
a membrane positioned within the enclosure and configured to partition the enclosure into a first enclosure and a second enclosure;
an electro-dynamic motor coupled to the membrane, wherein the electro-dynamic motor is positioned in the second enclosure; and
means for generating an electrical signal having one or more frequency spectrum components excited simultaneously and having a substantially same amplitude, wherein the electro-dynamic motor is configured to displace the membrane to generate a reference pressure within the enclosure in response to the electrical signal.

12. The calibration device of claim 11, wherein the one or more excited frequency spectrum components of the electrical signal have a zero phase shift.

13. The calibration device of claim 11, wherein the one or more excited frequency spectrum components of the electrical signal have a constant delay.

14. The calibration device of claim 11, wherein the pressure sensor is an absolute pressure sensor.

15. The calibration device of claim 11, wherein the pressure sensor is a differential pressure sensor.

16. The calibration device of claim 11, wherein the reference pressure generated is time varying.

17. The calibration device of claim 11, wherein the frequency spectrum components are in a frequency range of and including 0.001 Hz to 100 Hz.

18. The calibration device of claim 11, wherein the means for generating further comprises:
a voltage source configured to provide a reference voltage;
means for providing an amplified voltage from the reference voltage;
means for providing an inverted amplified voltage from the reference voltage;
means for selectively switching between the amplified voltage and the inverted amplified voltage to produce the electrical signal.

19. The calibration device of claim 11, wherein the means for generating further comprises:
a microphone configured to detect variations in pressure in the enclosure and output a signal;
means for filtering the signal supplied by the microphone; and
means for controlling the reference voltage source and the switching means as a function of the filtered signal and a pseudo random signal.

20. A method for calibrating a pressure sensor coupled to an enclosure having a pressure generator device therein, the pressure generator device including a membrane positioned within the enclosure and configured to partition the enclosure into a first enclosure and a second enclosure, the pressure generator device including an electro-dynamic motor configured to displace the membrane to generate the reference pressure in the first enclosure in response to the electrical signal the method comprising:
generating an electrical signal having simultaneously excited frequency spectrum components having a substantially same amplitude; and
generating a reference pressure within the enclosure from the electrical signal.

21. The calibration device of claim 11, wherein the membrane, the first enclosure and the second enclosure is impermeable.

* * * * *